United States Patent [19]

Rodieck

[11] Patent Number: 4,497,333
[45] Date of Patent: Feb. 5, 1985

[54] SEQUENCING VALVE AND IRRIGATION SYSTEM

[76] Inventor: Chester C. Rodieck, 1035 N. Hamlin Way, Lindsay, Calif. 93247

[21] Appl. No.: 491,665

[22] Filed: May 5, 1983

[51] Int. Cl.³ .......................... F17D 1/20; F16K 31/18
[52] U.S. Cl. .................................. 137/122; 137/207; 405/36; 405/41
[58] Field of Search ............... 137/122, 207; 405/36, 405/41

[56] References Cited

U.S. PATENT DOCUMENTS

| | | | |
|---|---|---|---|
| 592,814 | 11/1897 | McCann | 137/433 X |
| 3,333,597 | 8/1967 | Sullivan | 137/207 X |
| 3,343,560 | 9/1967 | Nankivell | 137/207 |
| 3,797,253 | 3/1974 | Rodieck | 405/37 |
| 3,951,163 | 4/1976 | Rodieck | 137/122 |
| 4,014,361 | 3/1977 | Rodieck | 137/122 |

Primary Examiner—Martin P. Schwadron
Assistant Examiner—Stephen M. Hepperle
Attorney, Agent, or Firm—Robert R. Finch

[57] ABSTRACT

A valve having a hollow body, an inlet and outlet for supplying and discharging pressured liquid, the valve body has a normally open top and a closure is provided to close said open top when positioned over the top opening and held in place by pressure of liquid supplied to the body, a closed air chamber communicates with the interior valve body and is arranged to hold compressed air therein.

2 Claims, 7 Drawing Figures

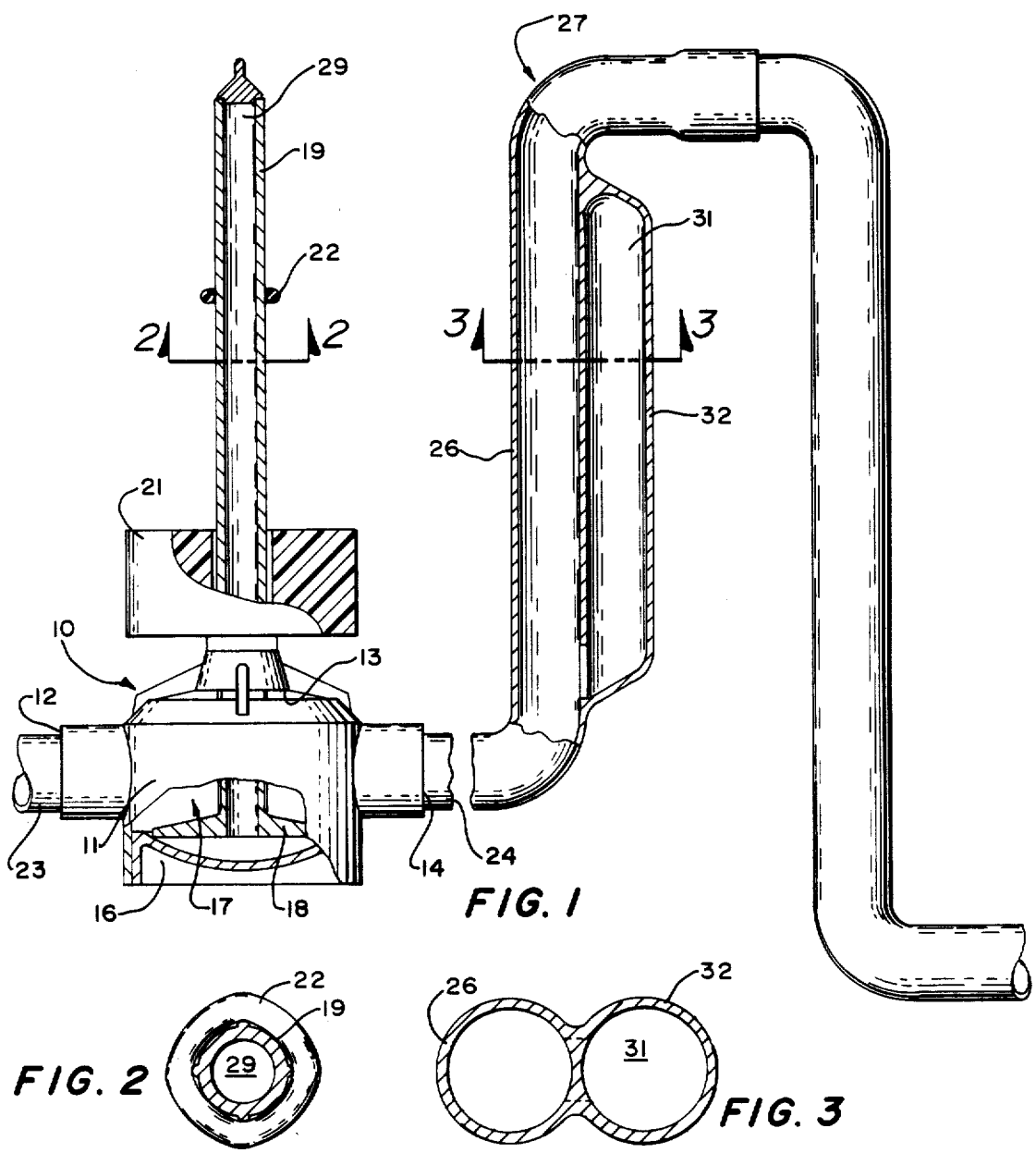
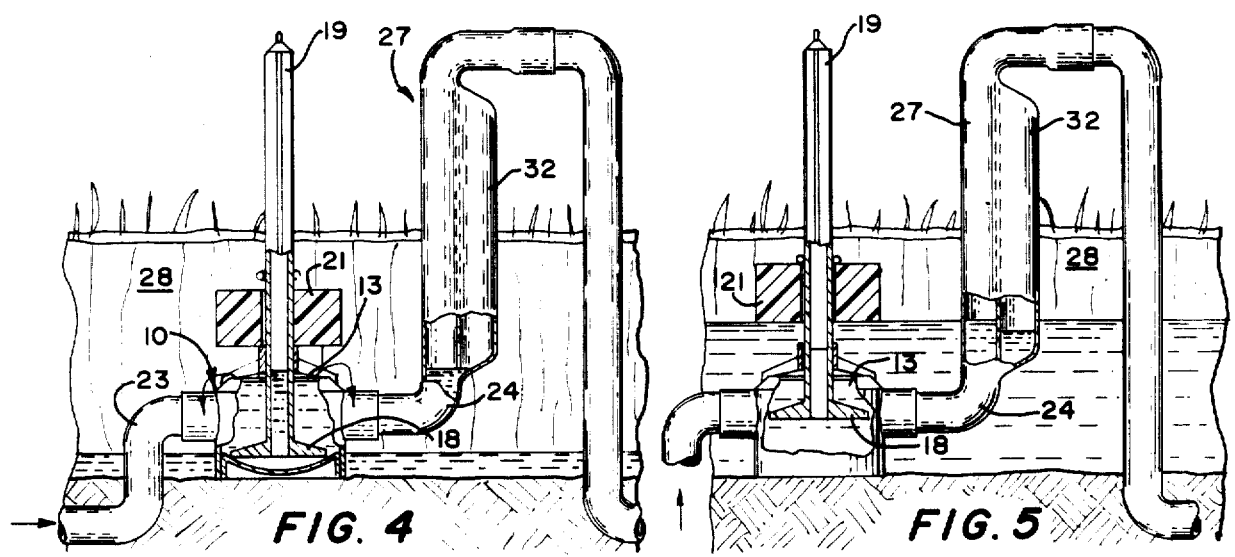

SEQUENCING VALVE AND IRRIGATION SYSTEM

FIELD AND BACKGROUND OF THE INVENTION

This invention relates generally to irrigation equipment and systems and in particular to equipment for systems employing a plurality of serially arranged stations to which a supply of irrigation water is to be sequentially delivered. The invention is an improvement in the equipment and systems described and claimed in my earlier U.S. Pat. Nos. 3,797,253; 3,951,163; and 4,014,361.

In many orchards, it is required that individual trees be watered by flooding a small basin formed around the base of the tree. In my earlier patents, of which U.S. Pat. No. 3,797,253 is representative, this is effected by providing a valve in each basin and serially connecting the valves to each other and to a source of pressured water. Each valve has a body with an inlet, a primary outlet, a secondary or flow-through outlet; and a float actuated closure member for selectively opening and closing the primary outlet. The inlet and flow-through outlets are connected into a closed conduit by which pressured water is supplied to the system while the primary outlet, when open, communicates directly with the atmosphere and the basin through a relatively large opening. Each valve has a closure member actuated in response to the level of water in the basin so that when sufficient water flows into the basin the primary outlet closes and water is diverted to the next valve in line. The closure member once in place over the primary outlet is adapted to be held there by internal water pressure thereby holding the outlet closed. The system also includes for each valve a delay means to block water from the next valve in line until after the first basin is filled and the primary outlet of the first valve is closed.

In my earlier U.S. Pat. No. 3,797,253 the delay means comprises an inverted vertical U following each valve in the system except possibly the last one. Water entering the riser leg of the inverted U encounters a resistance thus creating a back pressure to force water through the open primary outlet of the preceding valve. This flow continues until the respective basin fills and the float actuated closure member covers and closes the primary outlet. When this closure occurs, the water immediately flows on through the inverted U into the succeeding valve where the cycle is repeated. The sequence continues until all basins are filled and all primary valve outlets closed. In a given valve, once the primary outlet closes it should remain closed so long as there is pressure in the system even though water in a basin may drain completely away and there is no longer support for the floats. This is because only a modest internal pressure in the system is needed to hold the closure member over the primary outlet. After all basins are filled, system pressure is cut off and the basins drain thereby allowing all primary outlets to reopen for the next complete sequencing.

The system as described is operable, however, it is still not all that is to be desired in all situations. For instance, in many cases there may be a chattering of the float actuated closure and, even worse, a premature reopening of a primary valve outlet. These are due to hydraulic phenomena demonstrated in the system at the time whenever one of the primary outlets is closed and there is a sudden upset in the water flow into the next valve and out its primary outlet to atmospheric pressure. In other words, when the primary outlet of a valve is closed by the float actuated member, the closure is very sudden and the resulting flow out the secondary outlet through the conduit to the inlet of the next valve is very abrupt. Indeed it may be likened to a bullet. Then, immediately upon entering the next valve body, which is open to the atmosphere through the primary outlet, there is an almost instantaneous loss of pressure which is transmitted back through the closed conduit to all of the preceding closed system. The result is a loss of pressure in the system thereby temporarily releasing the pressure that holds the closure member against the primary outlet of the preceding valve. In cases where the water around the valve has drained to the point where the above closure means is ineffective, the pressure loss will allow the primary outlet to reopen thereby releasing all pressure downstream from the outlet until the primary outlet is reclosed. (There will also be an annoying chattering and possible damage due to a hunting action as the closure members vibrate between partly open and fully closed position.) The effect of reopening a primary outlet is to interrupt the sequence, thus opening all downstream primary outlets and forcing a repeat of the cycles. Automatic operation is thus thwarted and recourse to manual control is needed to complete the proper irrigation sequence.

SUMMARY OF THE INVENTION

It is the primary object of this invention to provide for a sequencing irrigation system of the type described apparatus to overcome the impact of the sudden pressure variations that occur as the result of closure of the primary outlet of a valve in the system.

A further object is the provision of means integral to the valve for carrying out the foregoing object.

A related object is the provision of means outside the valve itself, but integral to an irrigation system of the type described for overcoming the problems associated with the sudden pressure variation due to closure of primary outlets and sequencing.

DESCRIPTION OF THE INVENTION

In accordance with the invention, air cushion means are incorporated in the valve mechanism itself that automatically builds a pressured air cushion as soon as the primary valve outlet closes and hydraulic pressure is applied. In the preferred embodiment, the air cushion is a chamber associated with the primary outlet closure member and in direct communication with the valve body interior. Thus, as soon as the automatic closure member covers the primary outlet and water is diverted through the inverted U, the resulting hydraulic pressure builds a corresponding pressure in the air cushion by compressing air therein. Thereafter, even though there may be a tendency for hydraulic pressure loss due to conditions in the succeeding valve, there cannot be a complete pressure loss because the compressed air expands to maintain pressure. This then, prevents upstream primary outlets from reopening. In operation, each valve of the system will be equipped with the same type air cushion hence protection is accorded throughout the entire system between the initial pressure wear inlet and the last in series of the valves whose primary outlets are closed.

The size, location and configuration of the air cushion is quite important. That cushion need not be very large, because there is no measurable void created by liquid loss when hydraulic pressure is released. However, the air cushion volumn should be big enough to provide substantial air for compression. In general I have found that in a system employing up to ¾" water pipes and valve bodies of 18 cubic inches, a cushion volume of 5 cubic inches is adequate. Such relatively low volume is normally adequate because about that is needed to avoid opening of the primary outlets is a pressure of about ¼ lb/in² and almost no void need be filled.

For installations where the valves as supplied contain the air cushion, additional air cushions are not required. In fact actual tests have demonstrated that there will be no undesirable premature valve reopenings and chatter is eliminated with the consequence that the irrigation sequence is completed as programmed without intervention.

The invention provides an embodiment for use retrofitting existing installations where the valves are not equipped with integral air cushions. Such an embodiment includes an air cushion integral to the rising leg of the inverted U and locked to be pressured by the water as it flows through the U to the succeeding valve. The air cushion is thus immediately available to maintain pressure in the system and thus avoid pressure loss.

BRIEF DESCRIPTION OF THE DRAWING

In order that the invention may be more clearly understood and put into effect reference is made to the accompanying drawings and description thereof which are offered by way of example only and not in limitation of the invention the scope of which is defined by the appended claims including equivalents of elements embraced thereby rather than by any preceding description.

DETAILED DESCRIPTION OF THE INVENTION

FIG. 1 is a side view, partially in section, illustrating a valve and an associated conduit system embodying the invention.

FIG. 2 is a sectional view taken in the plane of line 2—2 of FIG. 1.

FIG. 3 is a sectional view taken in the plane of FIG. 3—3 of FIG. 1.

FIG. 4 is a view, partially cut-away, showing the valve while in the mode for initiating flow into an irrigation basin.

FIG. 5 is a view, similar to FIG. 4, but with the irrigation basin partially full and a corresponding change in position of valve components.

Figure 6:
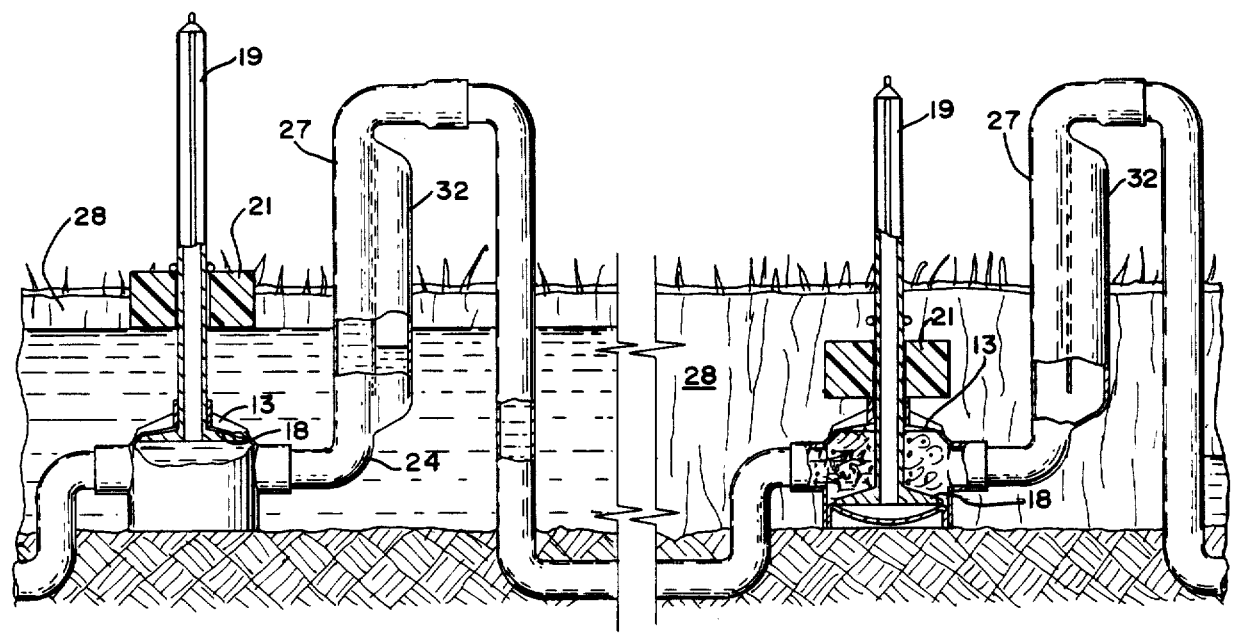

FIG. 6 is a view, partially cut away, emphasizing the initial flow between successive valves immediately following closure of the large primary outlet of an upstream valve.

Figure 7:
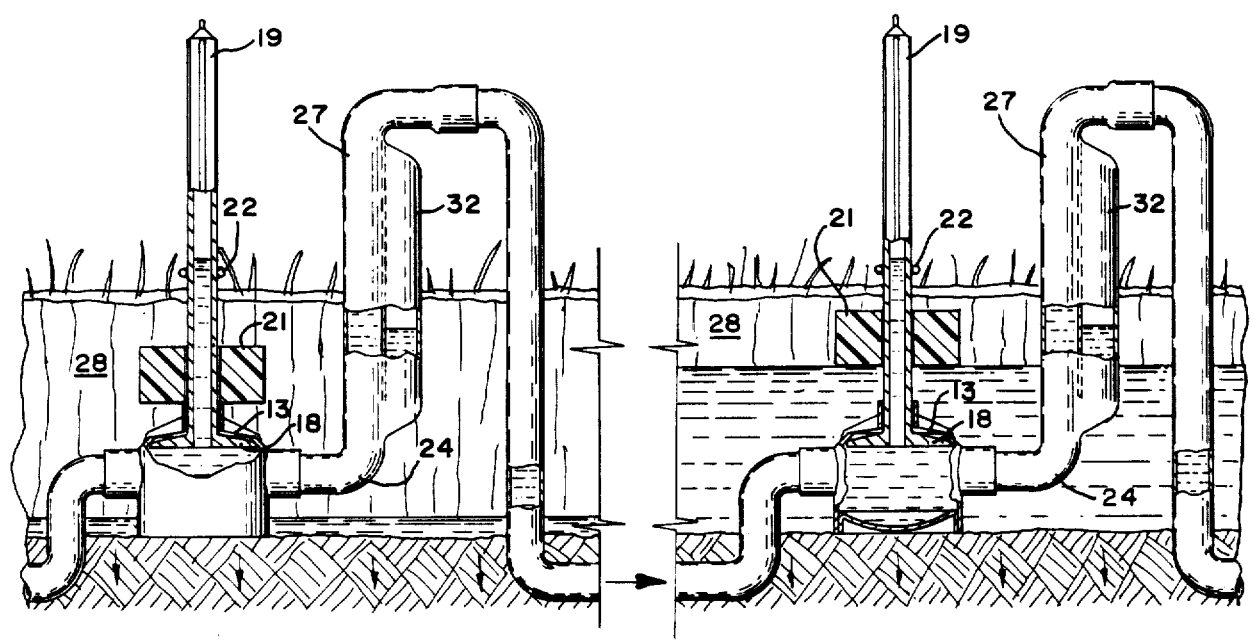

FIG. 7 is a view similar to FIG. 6, but with the primary outlets of both valves close even though water has drained from the basins to a level below that at which the float closes the primary outlets.

As illustrated, the valve, generaly designated 10, comprises a hollow cylindrical body 11 that is relatively large compared to its inlet 12 and has a generally open top 13 forming a primary outlet. A secondary or flow-through outlet 14 the same size as the inlet is provided. The body 11 has a closed bottom 16 and a closure member 17 formed with a plate 18 adapted to cover and thus close the primary outet 13. The closure member is provided with a hollow vertical guide 19 closed at the top to provide a pressure chamber that communicates through the plate 18 with the interior of the valve body. A float 21 is slidably mounted on the guide and on O ring is fitted on the guide to provide a limit to travel of the float.

Pressured water is supplied through a conduit 23 to the inlet 12 and an outlet conduit 23 connects to the secondary outlet 14, thence to a special riser leg 26 on an inverted U 27.

In operation, the valve, and for convenience the inverted U, are located in a basin defined by small earthen dikes 28 that surround the base of a tree.

Water is supplied through the inlet to the valve body then flows freely out the open primary outlet 13 into the basin until the water level therein rises to an elevation where the float 21 engages the O ring 22 to lift the plate toward the open top 13. When the plate nears the top, the internal water pressure forces it quickly against the opening thus closing it and diverting water through the outlet 14 into the conduit and inverted U thence through the flow-through outlet 14, conduit 24, and member 27 to the succeeding valve.

The water flows very rapidly through the conduit and riser but the rapid flow is interrupted when it reaches the succeeding valve body which is open to the atmosphere through the primary outlet 13. The pressure drop resulting from this upset in flow apparently creates a vacuum in the conduit which does, except for this invention, pull the closure plate 18 into the valve body. If the water level in the basin has dropped, the float 21 is ineffective and the closure plate 18 falls well into the valve body 11 thereby opening the top primary outlet. Once open, the outlet stays open until the water level causes the float to rise or there is manual intervention.

In accordance with this invention the effect of the flow interruption is completely offset by the provision of air cushions 29 and 31 in either the hollow vertical guide 19 of the valve or the side chamber 32 in the inverted U or both. Immediately the closure plate 18 covers the primary outlet, the water is forced up the riser leg of the inverted U. The resistance to uphill flow creates a back pressure that compresses the air in both the vertical valve closure guide 19 and, if provided, the side chamber 32. The air is compressed at least enough to force the water over the inverted U. With the air cushion operable, any pressure drop due to upsetting the flow in the succeeding valve is immediately compensated for by the air cushion. As a result, sufficient pressure is continuously maintained in the valve body to hold the closure plate in place at all times thus avoiding any interruption in the sequencing program.

I claim:

1. A sequencing valve comprising a hollow body closed on the sides and bottom and open at the top, an inlet port and an oulet port in the body wall spaced from each other and from said open top, a closure plate in said body moveable vertically therein in response to the level of water surrounding said body between a position that leaves said top open and a position where said closure plate covers said open top to close the same, and a closed top hollow tube that is open at the bottom end and is secured to said closure plate to extend therethrough and vertically upwardly therefrom.

2. An irrigation system comprising a plurality of basins for receiving and retaining water; a plurality of valves located at least one in each of said basins, each of said valves having a primary outlet and an inlet and an additional outlet spaced from said primary outlet, a gate in said valve moveable vertically therein in response to the level of water surrounding said valve between a lower gate position that leaves said primary outlet open for water flow and an upper gate position that closes said primary outlet to block water flow, said gate being arranged so that when in said upper position it is retained there by the pressure of water flowing through said valve; conduit means connected to said inlets and said additional outlets to connect said valves in series; a plurality of inverted Us connected into said conduit means there being one of said inverted Us connected into said conduit following at least each of said valves other than the last of said valves; and a plurality of pressure chambers connected into said conduit means with separate ones of said pressure chambers being connected into said conduit means preceding the first one of said inverted Us and into locations in said conduit means between each two of the remaining inverted Us.

* * * * *